United States Patent Office 3,205,281
Patented Sept. 7, 1965

3,205,281
METHOD OF SELECTIVELY HYDROGENATING ACETYLENIC COMPOUNDS IN A GAS CONSISTING PREDOMINATELY OF OLEFINS
Harold W. Fleming and William R. Price, Louisville, Ky., assignors to Chemetron Corporation, Chicago, Ill., a corporation of Delaware
No Drawing. Original application Mar. 2, 1959, Ser. No. 807,263. Divided and this application Nov. 15, 1961, Ser. No. 158,631
3 Claims. (Cl. 260—683)

This application is a division of our application Serial No. 807,263, filed March 2, 1959.

This invention relates to a method of producing a catalyst useful in the selective hydrogenation of unsaturated hydrocarbons and especially to the selective hydrogenation of acetylenic hydrocarbons in gas mixtures containing olefins. More particularly, this invention relates to an improved catalyst containing a Group VIII metal and a Group VI metal on a low surface area carrier consisting essentially of anhydrous alpha-alumina.

Because of the relative instability of the triple bond, acetylenic hydrocarbons may be hydrogenated more readily than hydrocarbons containing double bonds, and selective hydrogenation of acetylene in a gas mixture containing olefins is possible by utilization of a catalyst of appropriate activity to cause the hydrogenation of acetylene to occur at a much greater rate than the hydrogenation of the olefins. However, the problem is rendered much more complex when only small amounts of acetylene are present in the gas mixture and when it is necessary to completely hydrogenate the acetylene without appreciably lowering the olefin content in order to produce a gas mixture suitable for use as a synthesis intermediate. By way of example, gas mixtures consisting essentially of olefins and hydrogen for the production of polyethylene in general should not contain more than about 25 parts of acetylene per million parts of the mixture. Mixtures containing higher acetylene concentrations have been found to be unsuitable for the polymerization reaction.

An object of this invention is to provide a catalyst which is capable of hydrogenating small amounts of acetylenes in gas mixtures in such manner that the reaction proceeds virtually to completion at a high space velocity to reduce the acetylenes content to a few parts per million, and since any olefins which are hydrogenated in a gas mixture containing same are effectively lost, a related object is to provide an acetylene hydrogenation catalyst which is relatively inactive in promoting hydrogenation of olefins even in mixtures containing a major proportion of olefins.

A further object is to provide a catalyst which is relatively inactive in polymer formation in the olefin stream and produces relatively little carbon deposit on the catalyst, thereby attaining longer effective life and higher mechanical strength.

Another object is to provide a catalyst which has a relatively long effective life, good resistance to thermal shock, high mechanical strength even after long use, and resistance to the effects of poisons such as carbon monoxide which are usually present in hydrocarbon mixtures derived from petroleum.

An additional object of the invention is to provide a catalyst which is resistant to sulfur poisoning and which is effective in selectively reducing acetylenes in olefin streams containing relatively large quantities of organic sulfur.

Another object is to provide a catalyst which may be readily regenerated after continued use and restored virtually to its original activity with its physical properties unimpaired.

These and other objects will be apparent from and are achieved in accordance with the following disclosure.

We have discovered that a superior selective hydrogenation catalyst may be formed by impregnating or otherwise applying to a carrier of substantially anhydrous alpha-alumina of low surface area, a combination of metals of Group VIII and Group VI of the Periodic Table. This combination of metals is customarily applied to the alumina in the form of oxides or salts which on calcining at temperatures in the range of 300° to 1100° F. are converted to oxides. During the initiation of the selective hydrogenation reaction in an olefin stream containing hydrogen, the metal oxides are reduced to a lower oxidation state or to the respective metals on the alumina and serve as an effective selective hydrogenation catalyst. The Group VIII metal is preferably of Series 4, such as cobalt or nickel and the Group VI metal is preferably selected from Group VIB, such as chromium and molybdenum. Ordinarily, nickel and chromium are used in combination as are cobalt and molybdenum, although other combinations are also operative.

The relative amounts of the respective Group VIII and Group VI metals are not believed to be critical, particularly since adjustment of activity and selectivity can be readily accomplished by varying the proportions of active material and carrier. The Group VIII metal or metals, in oxide form, can vary from less than 1% to 8% by weight of the total catalyst, and the Group VI metal or metals, in oxide form, can vary from less than 1% to 10% by weight of the total catalyst. The atomic ratio of Group VIII metal to Group VI metal is preferably about 1:1, but may vary from about 50:1 to about 1:50 without substantially affecting the catalyst efficacy.

The alumina carrier is a low surface area anhydrous alumina of the alpha crystalline form, obtained by calcination of one or more of the low temperature forms of alumina. For the purposes of this invention the surface area should preferably be not greater than about one square meter per gram of alumina, and in any event less than about five square meters per gram of alumina. The alpha-alumina carrier can be used in any conventional shapes such as spheres, tablets, rings or pellets. The alpha-alumina at the time of application of the metals should be in the anhydrous form and preferably this is obtained by prior high temperature calcination at temperatures of 1800° to 3500° F.

The carrier should consist essentially of anhydrous alpha-alumina but ordinarily small amounts (5 to 15%) of other oxides, such as silica, titania, iron oxides and alkali and alkaline earth metal oxides are not disadvantageous. Ordinarily, silica is the material which appears in largest concentration and often may be in the range of 10 to 15% of the total carrier.

Particularly satisfactory for this invention are spheres of calcined (at 2400° F.) alpha-alumina sold by the Norton Company. These spheres have a surface area of less than 1 square meter per gram and have a pore volume of substantially 0 by the carbon tetrachloride method. These spheres are substantially alpha-alumina containing about 11% of silica and traces (0.1% to 0.3%) of iron, magnesium, calcium, sodium, potassium and titanium oxides. X-ray diffraction analysis of the alpha-alumina spheres has shown that the silica exists largely as mullite as the major silica-containing constituent and very small quantities of the silica exist as sillimanite. Other forms of alpha-alumina such as Alcoa T-71 extrusions are satisfactory. The latter are extrusions of ¾ inch or 1 inch diameter of essentially 100% alpha-alumina.

The catalytic metals may be applied to the anhydrous alpha-alumina support by spraying the support with a solution of the metals in soluble form or by dipping the carrier into such solution. Each metal can be applied separately from separate solutions or the metals can be applied in one step from a single solution containing them. The spraying or dipping procedure is controlled so that selected amounts of the metals are combined with the carrier. Then the carrier is heated to a temperature of 300° F. or higher to evaporate the moisture and decompose any salts which are present to form metal oxides.

Although the catalytically active material has been described herein as a mixture of oxides of metals of Groups VI and VIII, such as nickel and chromium, or cobalt and molybdenum, or other combinations, it is to be understood that the exact chemical nature of the catalytic material is not known. It may be a mixture of oxides, or it may be a compound formed between the metal oxides or a mixture of the two or other types of compounds or mixtures thereof.

The relative amounts of active material and carrier may of course also be varied over a range, and in certain instances it has proved necessary to do so in order to achieve the desired selectivity and activity. In general, however, the weight percentage of catalytic metals, in oxide form, to total catalyst mass should be within the range of about 1% to about 18%, depending upon the atomic ratio of the Group VIII to the Group VI metals in the catalyst mass, the composition of the carrier, the composition of the gas stream to be treated and the degree of acetylene removal desired.

The composition of the carrier material is very important because of the extremely rigorous treatment to which catalysts of this type are subjected. Generally, after beds of acetylene hydrogenation catalysts have been in use two or three weeks polymer deposits are formed upon the surface which render the catalyst less effective. These deposits are burned off by passing steam and air through the catalyst bed at a temperature of about 750° F., and within the bed the temperature may rise as high as 1200° F. due to the heat generated by oxidation of the polymer. Of necessity considerable thermal shock to the catalyst occurs during the two or three day period required for regeneration. Following the steaming treatment the catalyst must be reduced with hydrogen at a high temperature, and then the temperature is lowered to the operating range of about 400° F. Few carrier materials will withstand such regeneration treatment without physical or chemical breakdown, and this treatment must be repeated every two or three weeks during the life of the catalyst, which must be at least one to three years if the catalyst is to be suitable for commercial use. The alpha-alumina carrier has shown unusual properties in this respect.

The catalysts of this invention are effective in selectively hydrogenating acetylenic compounds in olefin gas streams to reduce the concentration of acetylenes to 10 p.p.m. or lower under a wide range of conditions. The temperature of the selective hydrogenation can vary from 250° to 600° F., the pressure from 50 to 250 p.s.i.g., the hourly space velocity up to 2000, the steam concentration from 1% to 6% or higher, and organic sulfur content as high as 160 p.p.m. The catalysts are unusually resistant to poisoning and can be regenerated many times by oxidation with steam and air without loss of strength or breakage.

The following examples illustrate the preparation of catalysts within the scope of this invention and the use of such catalysts in the selective hydrogenation of olefin streams to remove acetylenes without substantial loss of the olefins and without serious polymer formation and carbon deposit on the catalyst. These examples are provided for the purposes of illustration only and are not intended to limit the invention. It will be apparent to those skilled in the art that numerous modifications in materials, concentrations, times and other operating conditions may be made without departing from the invention. Likewise, equivalent materials may be substituted for those disclosed in the examples without departure from the invention.

EXAMPLE 1

To a solution of 206 parts of chromic anhydride ($CrO_3$) and 32.4 parts of nickel nitrate hexahydrate diluted with water to a total of 500 parts were added 250 parts of ¼ inch anhydrous alpha-alumina spheres (Norton). The composition of the spheres was the following:

|  | Percent |
|---|---|
| $Al_2O_3$ | 87.8 |
| $SiO_2$ | 11.2 |
| $Fe_2O_3$ | 0.3 |
| MgO | 0.1 |
| CaO | 0.1 |
| $Na_2O$ | 0.1 |
| $K_2O$ | 0.1 |
| $TiO_2$ | 0.3 |

The spheres were submerged in the chromium nickel solution for 20 minutes, then removed and allowed to drain for 20 minutes. The impregnated spheres were then calcined according to the following schedule:

1 hour at 300° F.
1 hour at 500° F.
1 hour at 700° F.
1 hour at 900° F.
8 hours at 1100° F.

The catalyst so prepared contained 5.0% $Cr_2O_3$ and 0.25% NiO.

The catalyst prepared above exhibited good selectivity and activity at temperatures of 250° to 500° F. Below 250° F. the catalyst was not sufficiently active to hydrogenate the acetylene to less than 10 parts per million.

Table I below shows the performance of this catalyst in the selective hydrogenation of acetylene in an olefin stream containing 6% steam at 200 p.s.i.g. and 600 S.V. The gas composition was 51.6% methane, 19.8% ethylene, 5.9% propylene, 20.6% hydrogen, 0.4% butadiene, 1.5% carbon monoxide, and the balance acetylene.

*Table I*

| Hours on Stream | Temp., °F. | Inlet Sulfur, COS, p.p.m. | Percent Olefins Hydrogenated | $C_2H_2$, p.p.m. In | $C_2H_2$, p.p.m. Out |
|---|---|---|---|---|---|
| [1] 5 | 450 | 1.5 | 2.4 | 1,850 | 4 |
| 29 | 350 | 1.5 | 1.8 | 1,850 | 2 |
| 77 | 250 | 1.5 | 0.0 | 1,850 | 8 |
| [2] 78 |  |  |  |  |  |
| 102 | 300 | 9 | 1.4 | 4,660 | 5 |
| 133 | 350 | 9 | 2.2 | 4,660 | 3 |
| 164 | 500 | 9 | 0.0 | 4,660 | 4 |

[1] Catalysts given regeneration treatment with 5% air and 95% steam for 4 hours at 850° F. and then reduced with moist hydrogen for 8 hours at 850° F. prior to going on stream.
[2] New gas mixture on stream: 42.5% methane, 44.0% ethylene, 13.0% hydrogen, 0.5% acetylene and 9 p.p.m. sulfur as COS.

EXAMPLE 2

A solution of chromium and nickel salts was prepared by combining 273 parts of chromic anhydride with 364 parts of nickel nitrate hexahydrate and diluting the mixture to a total of 500 parts. 500 parts of ¼ inch alpha-alumina spheres (Norton) were dipped into the chromium nickel solution for 30 minutes, after which they were removed and allowed to drain for 20 minutes. The spheres were calcined at 950° F. for 8 hours. The catalyst thus prepared contained 5.5% $Cr_2O_3$ and 2.6% NiO.

The catalyst showed good selectivity and activity as a selective acetylene hydrogenation catalyst in the temperature range of 325° to 450° F. Table II below gives data obtained in the selective hydrogenation of acetylene in an olefin stream containing 31.0% methane, 32.0% ethylene, 12.0% propylene, 0.3% propadiene, 0.7% acetylene, 14.0% hydrogen, 0.5% oxygen, 7.0% carbon dioxide and 2.5% carbon monoxide at 175 p.s.i.g. and 500 S.V., the olefin stream containing 6% steam.

Table II

| Hours on Stream | Temp., °F. | Inlet Sulfur, COS, p.p.m. | Percent Olefins Hydrogenated | $C_2H_2$, p.p.m. In | $C_2H_2$, p.p.m. Out |
|---|---|---|---|---|---|
| [1] 72 | 350 | 93 | 0.2 | 7,236 | 0 |
| 168 | 325 | 93 | 0.0 | 7,236 | 8 |
| 384 | 400 | 148 | 0.0 | 6,650 | 1 |
| 720 | 450 | 158 | 0.8 | 6,700 | 7 |
| [2] 816 | 450 | 158 | 2.8 | 6,700 | 16 |
| 24 | 350 | 158 | 1.3 | 6,700 | 0 |
| 384 | 450 | 132 | 0.1 | 7,250 | 6 |
| [3] 720 | 450 | 132 | 0.0 | 7,250 | 5 |
| 24 | 350 | 142 | 0.3 | 12,300 | 6 |
| 101 | 450 | 142 | 0.3 | 12,300 | 3 |

[1] Catalyst given regeneration treatment with 5% air and 95% steam for 4 hours at 850° F. and then reduced with moist hydrogen for 8 hours at 850° F. prior to going on stream.
[2] After 816 hours, run halted and catalyst regenerated with 5% air in steam for 4 hours at 850° F. and then reduced with moist hydrogen for 8 hours at 850° F.
[3] After 720 hours of the second cycle, run halted and catalyst regenerated with 5% air in steam for 4 hours at 850° F. and then reduced with moist hydrogen for 8 hours at 850° F.

molybdenum oxides on a carrier of hydraulic cement, alumina and clay. The commercial catalyst was in the form of ¼ inch compressed pellets and is widely used commercially for the selective hydrogenation of acetylenes (trace quantities) in olefin streams. The test was accomplished by charging the two catalysts into identical but separate reactors arranged in parallel so as to be fed from a common gas stream, thereby providing identical operating conditions. In the test 25 cc. of each catalyst was charged into the reactors which were operated at 450° F. and 185 p.s.i.g. at an hourly space velocity of 600. In the normal commercial procedure for selective hydrogenation of acetylenes in raw ethylene streams at least 6% steam is required but in this study the steam was reduced to 3% to make an accelerated or severe test by increasing the tendency for polymer formation on the catalysts. In addition the butadiene concentration in the gas stream was higher than normal to increase the tendency for polymer formation.

The results of the comparative tests are shown in Table III. The gas composition was 17.2% hydrogen, 47.9% methane, 17.4% ethylene, 2.5% ethane, 8.1% propylene, 0.7% propane, 4.7% butadiene, 02% acetylene, 0.9% carbon monoxide and 0.4% carbon dioxide. The test conditions were 185 p.s.i.g., 600 hourly space velocity and 3% steam.

Table III

PART A—COMMERCIAL Co-Mo CATALYST

| Hours on stream | Temp., °F. | Percent $H_2$ In | Percent $H_2$ Out | Percent Olefins In | Percent Olefins Out | Percent $C_4H_6$ In | Percent $C_4H_6$ Out | $C_2H_2$, p.p.m. In | $C_2H_2$, p.p.m. Out |
|---|---|---|---|---|---|---|---|---|---|
| 6 | 450 | 17.0 | ---- | 25.2 | 28.8 | 4.7 | 3.5 | 2,215 | 4 |
| 47 | 450 | 17.0 | 11.3 | 25.2 | 28.7 | 4.7 | 1.8 | 2,215 | 2 |
| 103 | 450 | 18.8 | 13.5 | 24.1 | 28.0 | 5.8 | 2.4 | 2,400 | 10 |
| 131 | 450 | 17.0 | 14.1 | 27.1 | 28.8 | 5.6 | 3.5 | 2,125 | 119 |

PART B—CATALYST OF EXAMPLE 3

| 6 | 450 | 17.0 | ---- | 25.2 | 28.3 | 4.7 | 1.7 | 2,215 | 4 |
| 47 | 450 | 17.0 | 14.0 | 25.2 | 25.7 | 4.7 | 3.8 | 2,215 | 4 |
| 103 | 450 | 18.8 | 16.0 | 24.1 | 25.5 | 5.8 | 5.1 | 2,400 | 5 |
| 131 | 450 | 17.0 | 15.1 | 27.1 | 27.6 | 5.6 | 4.8 | 2,125 | 34 |

EXAMPLE 3

A catalyst containing 1.5% CoO and 2.9% $MoO_3$ was prepared as follows:

85.5 parts of molybdenum trioxide were dissolved in 120 parts of 28% aqueous ammonia diluted with 110 parts of water. Then 115 parts of citric acid were dissolved in 250 parts of an aqueous cobalt nitrate solution containing 172 parts of cobalt nitrate hexahydrate. The solution of molybdenum was added to the solution of cobalt nitrate and into the resulting solution were dipped 250 parts of calcined ¼ inch alpha-alumina spheres (Norton) having a volume percent porosity of 41% and a crush strength of 95 lbs. (dead weight load). The alumina spheres were immersed in the solution for 30 minutes and then allowed to drain for 20 minutes. The spheres were then calcined at 950° F. for 8 hours.

The catalyst so prepared was evaluated by direct comparison to a well kown commercial selective hydhogenation catalyst made in accordance with the teachings of Fleming and Reitmeier application Serial No. 714,052, filed February 10, 1958, and comprising cobalt and In these runs the catalysts were subjected to the usual regeneration procedure prior to use in the olefin stream in order to subject the catalyst to ordinary operating conditions. The regeneration was done by steaming the catalysts at 850° F. for 5 hours in a stream of 5% air and 95% steam. Thereafter the catalysts were reduced in a moist hydrogen stream at 850° F. for 8 hours prior to going on stream.

Generally both catalysts exhibited good activity and selectivity during the greater part of this study. In the latter stages of the tests, however, a loss of activity was apparent in the commercial catalyst.

The run was stopped after 131 hours in each case and then the catalyst was removed and analyzed to determine the amount of carbon content thereof. The commercial cobalt-molybdenum catalyst on a carrier of cement, alumina and clay had a carbon content of 8.25% and 13 cc. of liquid polymer was present in the condensate pot of the apparatus. On the other hand, the catalyst of Example 3 had a carbon content of only 0.82% and less than 0.5 cc. of liquid polymer was present in the condensate pot. From these results it is seen that the catalysts exhibited a marked difference in their effect on the polymer-forming constituents of the gas stream. A much greater decrease was noted in butadiene concentration over the commercial material and of special significance was the difference in the amount of liquid polymer present in the condensate pots following completion of the run. Even more significant was the difference in the carbon content of the catalysts after completion of the runs. The carbon content is indicative of polymer formation within the catalyst or on its surface and/or decomposition of this polymer during the run.

EXAMPLE 4

A catalyst containing 2.02% CoO and 3.98% $MoO_3$ on alpha-alumina spheres was prepared by the method of Example 3 using longer immersion times, the other conditions being the same as those of Example 3. The evaluation of this catalyst was primarily for the purpose of determining the optimum temperature range for efficient operation. The conditions for the tests and the composition of the gas stream were the same as those described in the prior example except that the temperature was varied from 300° to 350° F. The results are given in Table IV:

Table IV

| Hours on Stream | Temp., °F. | $C_2H_2$, p.p.m. | |
|---|---|---|---|
| | | In | Out |
| [1] 4 | 350 | 2,200 | 0 |
| 31 | 300 | 2,200 | 0 |
| 53 | 300 | 2,200 | 0 |
| 156 | 350 | 2,350 | 2 |

[1] Catalyst treated with 5% air and 95% steam at 850° F. for 4 hours, then reduced with moist hydrogen at 850° F. prior to going on stream.

It is seen that this catalyst is effective over the range of 300° to 350° F.

What is claimed as new and is desired to be secured by Letters Patent of the United States is:

1. A method of selectively hydrogenating acetylenic compounds in a gas containing the same and containing olefins as a major part of the unsaturated hydrocarbons, which comprises contacting said gas admixed with hydrogen in excess of the stoichiometric amount required to reduce said acetylenic compounds to olefins, with a catalyst comprising a calcined mixture of an oxide of a metal of the group consisting of cobalt and nickel and an oxide of a metal of the group consisting of chromium and molybdenum supported on a carrier consisting essentially of anhydrous alpha-alumina at a temperature in the range of 250° to 600° F. and a pressure in the range of 50 to 250 p.s.i.g. for a period of time sufficient to hydrogenate substantially all of said acetylenes, wherein the alpha-alumina has a surface area of less than about five square meters per gram.

2. The method of claim 1 wherein one of the metals is nickel and one of the metals is chromium, wherein the alpha-alumina has a surface area not greater than about one square meter per gram.

3. The method of claim 1 wherein one of the metals is cobalt and one of the metals is molybdenum, wherein the alpha-alumina has a surface area not greater than about one square meter per gram.

References Cited by the Examiner

UNITED STATES PATENTS

| 2,800,518 | 7/57 | Pitzer | 252—465 |
| 2,735,879 | 2/58 | Redcay | 260—677 |
| 2,840,531 | 6/58 | Fleming et al. | 260—677 |

FOREIGN PATENTS 203,801   10/56   Australia.

OTHER REFERENCES

Bond et al.: "Faraday Society Transactions," vol. 54, No. 10, October 1958, pp. 1537–1546.

ALPHONSO D. SULLIVAN, *Primary Examiner.*